United States Patent [19]

Steinberg et al.

[11] 3,861,944

[45] Jan. 21, 1975

[54] METHOD OF MAKING CORROSION RESISTANT CONCRETE ARTICLES

[75] Inventors: Meyer Steinberg, Huntington Station; Lawrence E. Kukacka, Port Jefferson; Anthony J. Romano, Kings Park, all of N.Y.

[73] Assignee: The United States of America as represented by the United States Atomic Energy Commission, Washington, D.C.

[22] Filed: Nov. 6, 1972

[21] Appl. No.: 303,753

[52] U.S. Cl.................. 117/72, 52/727, 117/93.31, 117/94, 117/123 D, 138/145, 138/146
[51] Int. Cl............................. B44d 1/16, F16l 9/14
[58] Field of Search.......... 117/123 D, 113, 72, 94, 117/93.31; 52/727; 138/145, 146

[56] References Cited
UNITED STATES PATENTS

| | | | |
|---|---|---|---|
| 2,740,728 | 4/1956 | Sonnabend | 117/123 D |
| 3,197,331 | 7/1965 | Rohn | 117/123 D |
| 3,455,801 | 7/1969 | D'Alelio | 117/93.31 |
| 3,464,853 | 9/1969 | La May | 117/148 |
| 3,553,005 | 1/1971 | Moragne | 117/59 |
| 3,567,496 | 3/1971 | Steinberg | 117/123 D |
| 3,579,369 | 5/1971 | Foster | 117/148 |
| 3,759,774 | 9/1973 | Bader | 117/123 D |
| R27,061 | 2/1971 | Rubenstein | 117/123 D |

*Primary Examiner*—William D. Martin
*Assistant Examiner*—William H. Schmidt
*Attorney, Agent, or Firm*—John A. Horan; Leonard Belkin

[57] ABSTRACT

Concrete pipes are rendered resistant to corrosion by a process in which the pipe is first impregnated with a liquid monomer which is then polymerized in situ followed by an application of a coating of a liquid monomer which is polymerized in situ followed by a second coating application which is polymerized in situ. Preferably the coating material has a higher viscosity than the impregnating material. The monomers disclosed are styrene, acrylonitrile, methyl methacrylate, isobornyl methacrylate and trimethylolpropane trimethacrylate. Mixtures of styrene and polyester are also disclosed. Polymerization may be carried out by a thermal process using a catalyst or by the use of radiation.

4 Claims, No Drawings

METHOD OF MAKING CORROSION RESISTANT CONCRETE ARTICLES

BACKGROUND OF THE INVENTION

The invention described herein was made in the course of, or under a contract with the U.S. Atomic Energy Commission.

U.S. Pat. No. 3,567,496 issued on Mar. 2, 1971 to Steinberg et al. discloses a process for improving certain physical properties of preformed concrete by impregnating the body with a polymerizable liquid monomer and then causing polymerization in situ. Typical applications for concrete bodies treated in accordance with the patented invention includes sewer pipe where the improved strength characteristics and reduced permability are highly desirable.

In many situations it is necessary to provide sewer pipe for use in highly corrosive environments where in addition to the improved physical characteristics already mentioned it would be desirable to have substantially greater resistance to the corrosive substances to which the sewer pipe is to be exposed.

SUMMARY OF THE PRESENT INVENTION

In accordance with the principles of the present invention there is provided a concrete body which is highly resistant to corrosive substances by impregnating the preformed concrete body with a liquid polymerizable monomer substance and then polymerizing the monomer in situ, followed by coating the surfaces of the body which will be exposed to the corrosive substances with a liquid polymerizable monomer substance and then polymerizing the latter monomer in situ. The type of polymerization in each case employed may be by use of a chemical promotor or catalyst, the use of a catalyst plus the use of heat, or gamma irradiation. Preferably also, the monomer employed for coating the surfaces should have greater viscosity than that employed in impregnating the body. The final product, in addition to having the improved physical characteristics mentioned previously in connection with the patented method, also is highly resistant to the corrosive effects of substances which otherwise would be highly detrimental to the product.

DESCRIPTION OF THE PREFERRED EMBODIMENTS

In accordance with a preferred embodiment of this invention a preformed solid concrete body is first impregnated with a liquid polymerizable monomer substance which is then polymerized in situ. By a polymerizable monomer substance is meant any monomer which can be polymerized through the use of a catalyst, promoter, initiator, heat, gamma irradiation or any combination thereof, the monomer containing the catalyst, promotor, etc. By the term preformed solid concrete body is meant a solid body formed of any of the various artificial building materials currently commercially available, made by mixing cement and sand with gravel, broken stone, or other aggregate substances and sufficient water to cause the cement to set and bind the entire mass.

Impregnation is complete when the body has completely dispersed therein the polymerizable monomer substance, preferably 1.0 weight percent to about 30 weight percent based on the weight of the concrete body.

If a catalyst is employed with the monomer, then the impregnated concrete body is heated to a sufficient temperature and for a sufficient period of time based upon the particular materials employed to obtain complete polymerization.

If the monomer is polymerized by irradiation, then the impregnated body is subject to $^{60}$Co gamma irradiation of sufficient intensity and for a sufficient length of time to obtain complete polymerization.

In a similar fashion, appropriate amounts of promoters and/or initiators would be added to the monomer if polymerization is to be obtained through their use.

After polymerization throughout the body is complete, the surfaces of the body which are to be exposed to the corrosive substances are coated with a liquid polymerizable monomer substance. While the monomer may be the same as that employed for the impregnation of the body, it is preferred that the monomer employed for coating the body should be one which is substantially more viscous, that is, at least ten times more viscous on an absolute viscosity scale than that employed for impregnation in order to obtain more uniform and effective coating. A typical viscosity for impregnating monomer substance is one centipoise whereas the coating monomer substance would be at least ten centipoise.

In coating the surfaces of the body which are to be exposed to the corrosive substances it has been found that multiple coatings preferably are applied for best results. For example, the surfaces may be coated and polymerized in situ, and then coated again followed by polymerization.

Monomers which are suitable for use in impregnating and coating the concrete body in accordance with this invention are commercially available and include styrene, polyester, acrylonitrile, methyl methacrylate, isobornyl methacrylate, and trimethylolpropane trimethacrylate. Conventional free radical peroxide polymerization catalysts may be used such as benzoyl methyl ethyl ketone peroxide, cyclohexononeperoxide, tertiary butyl peroxide, etc. A suitable promoter is 0.5 percent cobalt naphthanate. Those and other suitable materials are described in the aforementioned U.S. Patent.

The concrete should be substantially dry before it is impregnated with the monomer and preferably the body should be placed under a vacuum of 3 inches of mercury for one hour to ensure dryness or otherwise treated to eliminate moisture.

In the event a catalyst is employed, it may be added with the monomer or after impregnation or coating with monomer. When heat is employed for polymerization, a temperature in the range of 50°–85° C. should be maintained until polymerization is complete. When irradiation is employed for the polymerization of either the impregnated or coated monomer, a source of gamma irradiation such as $^{60}$Co may be employed. Sufficient radiation is employed to obtain complete polymerization. A typical intensity is an intensity of $2.5 \times 10^6$ rads/hr. for eights hours for a total dose of $2 \times 10^6$ rads.

EXAMPLES

Samples of concrete, $4 \times 4 \times 1$-in., were cut from a sewer pipe and impregnated with a 90 percent wt. styrene-10 percent wt. polyester mixture and polymerized by $^{60}$Co-gamma radiation. Prior to saturation with monomer the specimens were dried to constant weight at 105°C. and evacuated to pressure of −30 in. Hg for 1 hr. After soaking for 1 hr. at room temperature, 20 grams of monomer were absorbed. After polymerization the specimens were coated with a mixture consisting of 65 percent polyester-35 percent styrene containing 0.5 percent cobalt naphthenate, a promotor. Approximately 8 gr. of material was required to coat the samples. The material was polymerized at room temperature in ≈ 1 hr. by the addition of 1% methyl ethyl ketone peroxide catalyst.

Durability tests were performed using 5% $H_2SO_4$. In addition to the above specimens, control samples and unimpregnated samples containing coatings were evaluated. These results are summarized as follows:

| Specimen | Description of sample | Exposure time, day | Weight loss, % |
|---|---|---|---|
| I | Average of two unimpregnated controls | 17 | 32.0 |
| II | Unimpregnated but doubly coated | 112 | 27.2 |
| III | Impregnated and singularly coated | 76 | 29.2 |
| IV | Impregnated and doubly coated | 112 | 0 |

As noted, the fully impregnated and doubly coated sample (IV) was not attacked by the acid after exposure for 112 days. All other samples were attacked, specimen I being severely attacked.

Based upon these results, two pipe sections, 8-in.-diam × 18-in.-long were prepared using the same monomers and impregnation techniques. Each pipe section contained 5 lb. of monomer. In addition, a full 50-in.-length of sewer pipe weighting 140 lbs. was identically prepared. The full length of pipe was impregnated with 10 lb. of monomer and doubly-coated with 2 lb. of monomer in each coat.

The three lengths of pipe were each sealed at one end and ≈ 75 percent filled with 5% $H_2SO_4$ solutions. There was no apparent attack by the acid after 120 days. For 60 days the acid in one of the 18-in.-lengths of pipe was agitated gently.

Two lengths of pipe were tested by 90 days exposure to 5% $H_2SO_4$. There was no evidence of attack on one pipe and only slight spalling near a crack in the coating of the second pipe. If this pipe were of ordinary concrete, extensive deterioration of concrete would occur and bulging and peeling back of any surface coating could be expected.

What is claimed is:

1. A method of producing concrete bodies having increased compressive and tensile strengths, decreased water permeability, and increased resistance to corrosion comprising:
    a. impregnating a preformed concrete body by completely dispersing therein a liquid monomer mixture of about 90 percent wt. sytrene-10 percent wt. polyester;
    b. polymerizing said monomer mixture in situ;
    c. coating at least some of the exposed surfaces of said concrete body with a liquid monomer mixture of about 65 percent wt. polyester-35 percent wt. styrene and polymerizing the coated liquid monomer mixture in situ; and
    d. coating said surfaces a second time with the aforesaid liquid monomer mixture followed by polymerization in situ.

2. The method of claim 1 in which the concrete body is impregnated with monomer from 1.0 to 30 weight percent based on the weight of the concrete body.

3. The method of claim 2 in which polymerization of the impregnating mixture is induced by radiation.

4. The method of claim 3 in which polymerization of the coating mixtures is induced by the use of a promoter and catalyst.

* * * * *